United States Patent [19]
Draper et al.

[11] 3,949,113
[45] Apr. 6, 1976

[54] LINER FOR RESERVOIR OF LAYERED LIQUIDS

[75] Inventors: Homer L. Draper; Lew T. Gray, Bartlesville, Okla.

[73] Assignee: Phillips Petroleum Company, Bartlesville, Okla.

[22] Filed: Dec. 27, 1971

[21] Appl. No.: 211,931

[52] U.S. Cl.................... 428/286; 61/1 R; 61/7; 156/93; 428/57; 428/290; 428/291; 428/425; 428/489; 428/492
[51] Int. Cl.² .......................................... B32B 7/04
[58] Field of Search ............ 161/154, 155, 156, 205, 161/239, 236, 240; 156/93; 61/1, 7; 117/32; 52/309; 428/57, 286, 290, 291, 425, 489, 492

[56] References Cited
UNITED STATES PATENTS

| | | | |
|---|---|---|---|
| 2,319,267 | 5/1943 | Sawyer.............................. | 161/156 |
| 3,069,305 | 12/1962 | Fahrbach et al.................... | 161/156 |
| 3,252,822 | 5/1966 | Burns................................ | 161/155 |
| 3,461,673 | 8/1969 | Slover............................... | 61/7 |
| 3,474,625 | 10/1969 | Draper et al...................... | 161/92 |

*Primary Examiner*—George F. Lesmes
*Assistant Examiner*—James J. Bell

[57] ABSTRACT

A reservoir containing layered liquids is lined with a liner comprising a reaction resistant material lining the portion of the reservoir in contact with a reactive liquid with the remainder of the reservoir lined with a material that is not resistant to reaction with the reactive liquid. In a specific embodiment asphalt impregnated nonwoven fabric is used to line a reservoir portion in contact with water and butyl rubber impregnated nonwoven fabric is used to line the portion of the reservoir in contact with a hydrocarbon liquid floating on top of the water layer. In a specific embodiment sheets of liner material are fastened together in a liquid proof seal produced by facing liner sheets to be joined together, overlapping the face sheets with a layer of nonwoven fabric, sewing through the four strata laminate thus produced, and treating the nonwoven fabric with a liquid proofing substance.

4 Claims, 2 Drawing Figures

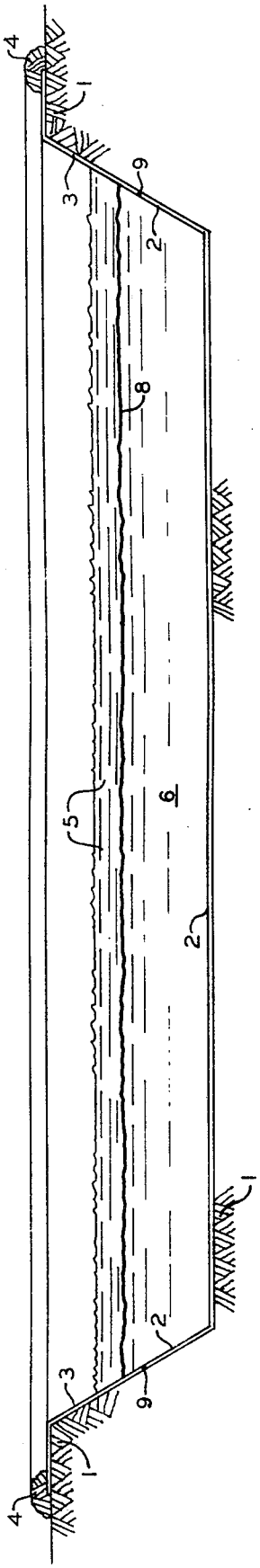
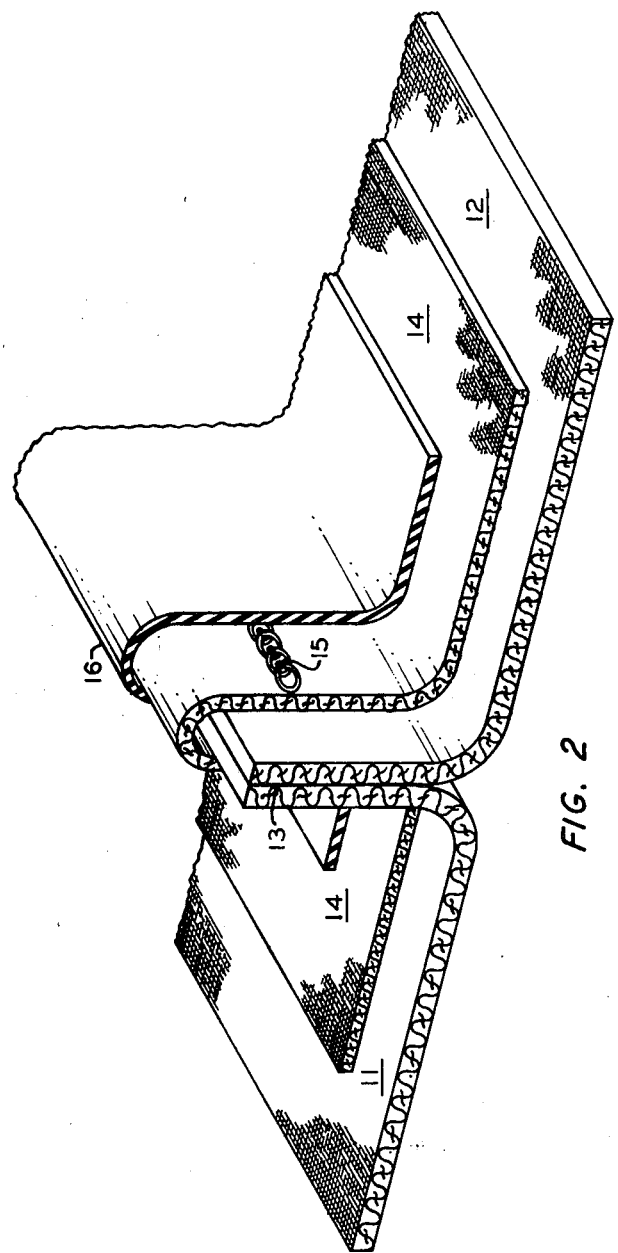

LINER FOR RESERVOIR OF LAYERED LIQUIDS

BACKGROUND OF THE INVENTION

To serve the purpose for which it is intended a reservoir liner must prevent the passage of liquid from the pool it contains through the liner to the surface which is covered by the liner. A problem of seepage through the liner can develop when the lining material is not resistant to chemical action of the liquid that it contains. The solution of the problem is to use a material for the liner which is not subject to reaction with the liquid that is contained within the reservoir. In most cases, where the liquid being contained will separate into two layers, only one of which poses a problem of reaction with the liner material, using a nonreactive liner material for the entire reservoir is not economically feasible.

We have found a method for lining a liquid reservoir which eliminates the problem of reaction between the reservoir liner and a layer of liquid contained in the reservoir. The use of this liner is also economically feasible.

We have also discovered a method for securing sheets of liner material to each other so that leakage of the contained liquid through the liner at its seams is eliminated.

It is therefore an object of this invention to provide a more economical method for lining a liquid reservoir for containing layered liquids in which one of the liquid layers is reactive with the materials of construction usually used for reservoir liners. It is another object of this invention to provide an economical reservoir liner for use with layered liquids one layer of which will react with normally used liner materials. It is still another object of this invention to provide a method for uniting sheets of construction material used as reservoir liners to produce a nonleaking seam.

By the method of this invention a reservoir which contains a distinct layer of reactive liquid with a layer of nonreactive liquid is lined in the section of the reservoir which contains the reactive liquid with a liner material resistant to reaction with the reactive liquid and the remainder of the reservoir is lined with a liner material which is not resistant to reaction with the reactive liquid.

In one embodiment of the invention the materials of construction are thermoplastic film or nonwoven fabric which are precoated with liquid resistant material and the sheets of construction material are fixed together in an appropriate arrangement in the reservoir. In another embodiment of the invention porous nonwoven fabric is arranged to cover the reservoir and liquid resistant material is then applied to the appropriate portions of the backing after the backing is in place.

In still another embodiment of the invention sheets of lining material are fastened together in a liquid proof seam by facing the edges of two separate sheets, overlapping the sheet edges with a strip of nonwoven fabric which extends around the edge of the face sheets producing a laminate of four strata of sufficient width to be sewn, sewing through the four strata to unify them and coating the nonwoven fabric with a liquid resistant material.

This invention can best be understood by reference to the drawing in which

FIG. 1 is a representation of a reservoir containing layered liquid showing placement of the resistant and nonresistant material of construction on the liner.

FIG. 2 illustrates in detail the laminated sewed liquid resistant seam made by the process of this invention.

Referring now to FIG. 1 it is seen that the prepared surface of an earthen reservoir 1 is covered with a liner material represented by 2 and 3 which is spread across the prepared surface 1 and can be held in place in the usual manner of construction by a continuing mound of earth 4 weighing down the edges of the liner. In this figure, the liner is made of two different materials of construction: a nonwoven thermoplastic fabric coated with asphalt 2 and a nonwoven thermoplastic fabric coated with butyl rubber 3 which are so arranged in the reservoir that the interface of the layered liquids contained in the reservoir, which in this illustration is a layer of hydrocarbon liquid 5 floating on a layer of water 6, form an interface 8 which is above the line 9 which marks the furthest extent of the resistant butyl rubber coated material 3 down the side of the reservoir. The butyl rubber coated fabric is resistant to the reaction of the hydrocarbon liquid 5 but is relatively more expensive than the asphalt coated fabric 2 which is not resistant to the hydrocarbon liquid 5 and which is used to line all of the reservoir where a hydrocarbon resistant liner is not necessary.

According to this invention the liner material 2 can be installed as a nonwoven fabric pretreated with asphalt which is joined at line 9 with material of construction 3 which is a nonwoven fabric pretreated with butyl rubber.

In another mode of construction the entire prepared surface of the reservoir 1 can be lined with sheets of nonwoven fabric or joined together to cover the prepared surface and then the nonwoven fabric can be treated with a coating of asphalt across the bottom of the reservoir and up the line 9 while the remainder of the sidewall of the reservoir above line 9 is treated with a coating of butyl rubber. It is readily apparent that the resistant coating material need only extend to the point above which the reactive liquid will not be allowed so that it covers only the reservoir wall area which will be in contact with the reactive liquid. None of the remainder of the liner need be coated with a material resistant to reaction with the reactive liquid and is coated with a material that is water proof.

In FIG. 2 is shown the preferred method of joining two sheets of liner material by the method of this invention. Two sheets of liner material 11 and 12 are faced with each other at 13. A strip of nonwoven porous fabric 14 is lapped over the face sheets 11 and 12 to form a four layer laminate 14, 11, 12, 14. This four layer laminate is then sewed together at 15. This produces a strong seam which is not subject to pull out of the threads as it would be if only a two layer laminate of 11 and 12 were sewed together. To liquid proof the seam a liquid coating of material 16 is applied to the nonwoven fabric which penetrates the fabric and on solidifying forms a liquid proof surface protecting the seam.

The conditions for use of this invention are that the relative amounts of the layered liquids in the reservoir be known so that the amount of wall surface dedicated to be protected from the reactive liquid can be calculated. The combinations of coating materials to be used with certain reactive liquids are within the knowledge of the art. For purposes of example we have chosen the use of a butyl rubber coated nonwoven fabric which is resistant to hydrocarbon liquid as the reactive liquid resistant lining material in combination with asphalt impregnated nonwoven fabric for the remainder of the liner.

Another reactive liquid resistant material which was tested successfully was a moisture cured polyurethane (Chemglaze, Hughson Chemical Company, Erie, Pennsylvania) which may be applied to a nonwoven fabric in the usual manner. Other representative resistant materials are nitrile rubbers, acrylonitrile-butadiene styrene (ABS) polymers, and polychloroprenes which are also readily applied to nonwoven or woven fabric substrates.

Any flexible porous nonwoven fabric can serve as a base for the portion of the reservoir liner contacting the reactive liquid in this invention. Presently preferred is a strong thermoplastic nonwoven fabric such as Petromat a trademarked material produced by the Phillips Petroleum Company.

The major portion of the reservoir which will not come into contact with the reactive liquid can be lined with thermoplastic film, a nonwoven fabric such as Petromat which has been coated with asphalt, or other commonly used lining materials. As stated before, the lining material can be pretreated with a liquid proofing agent or can be put in place and then coated with a liquid resistant material either by spraying, painting, flowing, or other common means of application.

Reasonable variation and modification are possible within the scope of the foregoing disclosure and the drawing of the invention the essence of which is that there has been provided a method and structure for a lined reservoir which is economical for use in containing layered liquids one layer of which can react with the usual materials of construction of reservoir linings.

We claim:

1. A liner for a reservoir which contains distinct, stratified layers of liquids said liner consisting of (1) a first liner portion comprising a flexible, porous, nonwoven fabric impregnated with a liquid impervious coating of a material which is resistant to chemical reaction with a contained liquid arranged to form an impervious container of sufficient dimensions at least to contain within said first liner portion a distinct volume of said reactive liquid said first material in physical contact with both said reactive liquid and a nonreactive liquid and (2) a second liner portion joined by a fluid impervious seam to said first portion said second portion consisting of a material of construction nonresistant to the reactive liquid that is in contact with said first liner portion and arranged to contain a nonreactive liquid within said second liner portion said second liner portion in physical contact only with the nonreactive liquid.

2. A reservoir liner of claim 1 wherein said first liner portion consists of a nonwoven fabric coated with butyl rubber or a nitrile rubber and said second liner portion is a nonwoven fabric coated with asphalt.

3. A reservoir liner of claim 1 wherein said first liner portion consists of a nonwoven fabric coated with a polyurethane or acrylonitrile-butadiene styrene (ABS) and said second liner portion is a nonwoven fabric coated with asphalt.

4. A reservoir liner of claim 1 wherein said second liner portion is a thermoplastic film sheeting.

* * * * *